Aug. 30, 1960

J. LEMSON 2,951,204

METHOD AND APPARATUS FOR LOCATING THE BASE
SECTION OF A TRANSISTOR BAR

Filed April 8, 1957

INVENTOR
Jack Lemson

BY Stevens, Davis, Miller & Mosher

ATTORNEYS

United States Patent Office 2,951,204

Patented Aug. 30, 1960

2,951,204

METHOD AND APPARATUS FOR LOCATING THE BASE SECTION OF A TRANSISTOR BAR

Jack Lemson, Dallas, Tex., assignor to Texas Instruments Incorporated, Dallas, Tex., a corporation of Delaware Filed Apr. 8, 1957, Ser. No. 651,271

8 Claims. (Cl. 324—158)

This invention relates to a method and apparatus for locating the center or base section of a transistor bar. The transistor bar under study consists of three semiconductor crystal sections, the center or base section, and the two end sections, which are the emitter and collector sections. The base section usually comprises a very thin layer separating the emitter and collector sections on each end of the transistor bar.

In general, according to the invention, the emitter and collector sections are cyclically alternately connected to ground through a resistor. A positively biased wire probe is placed in mechanical contact with the transistor bar and moved across the bar. When in contact therewith, a square wave voltage will appear across the resistor. This square wave voltage is produced regardless of position of the probe along the bar but, when the probe moves across the base or center section, the square wave voltage experiences a 180° phase shift. By observing where the probe is when this phase shift occurs, it is then possible to locate the base section.

Prior to this invention, the base section of a transistor has been located by a more complicated method of focusing a beam of light on the junction of the transistor bar, moving a probe across the transistor bar, and sensing the magnitude of the collector current. When the magnitude of the collector current changes, the probe has come in contact with the base section which is thereby located. The present invention presents a much simpler method and circuit and requires no special light beam producing and focusing apparatus.

Further advantages and the objects of the present invention will be obvious from the description with respect to the following figures.

Figure 1:
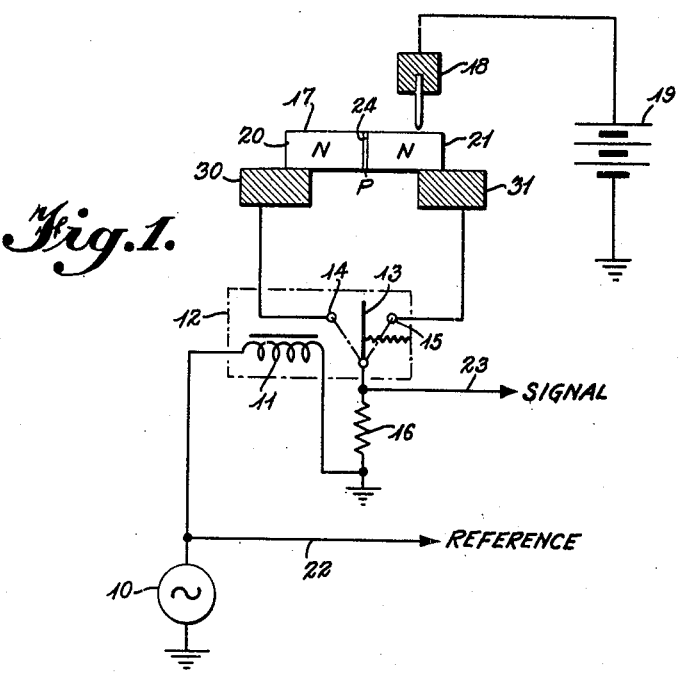
Figure 1 shows the circuit to be used according to the present invention.

In the circuit shown in Figure 1, a transistor bar 17 having a center or base section 24 of p-type material and two end sections 20 and 21 of n-type material, is positioned so that the two end sections 20 and 21 respectively come in mechanical contact with two metal blocks 30 and 31. An alternating carrier voltage is generated by a source 10 and applied to a winding 11 of a single pole double throw carrier controlled switch 12. The carrier controlled switch 12 has a moving contact 13, which is actuated by the voltage applied to the winding 11 and vibrates synchronously with the frequency of the applied voltage. As a result, the contact 13 alternately connects two contacts 14 and 15 to ground through a resistor 16. The contacts 14 and 15 are respectively connected to the metal blocks 30 and 31. By means of the vibration of the contact 13, the two end sections 20 and 21 are alternately connected to ground through the resistor 16. A wire probe 18 is made positive by applying a voltage to the probe from a battery 19. The wire probe 18 is placed in mechanical contact with the transistor bar and a resulting square wave voltage appears across the resistor 16 on a lead 23. This voltage is the signal output. The probe 18 is then moved across the transistor bar 17. When the probe passes over the base section 24 from one end section to the other, the square wave signal across the resistor 16 will experience a 180° phase shift. By observing or sensing when this phase shift across the resistor 16 occurs, a technician can accurately ascertain the location of the base section 24.

A second output voltage may be taken on the lead 22 as a reference voltage to be compared with the signal voltage. When the output signal on lead 23 is substantially out of phase with the reference voltage, the probe 18 is in contact with the end section 21 on the right base section 24 and when the signal voltage on the lead 23 is substantially in phase with the reference voltage on lead 22, the probe has passed over the base section and is then in contact with the end section 20.

Figure 2:
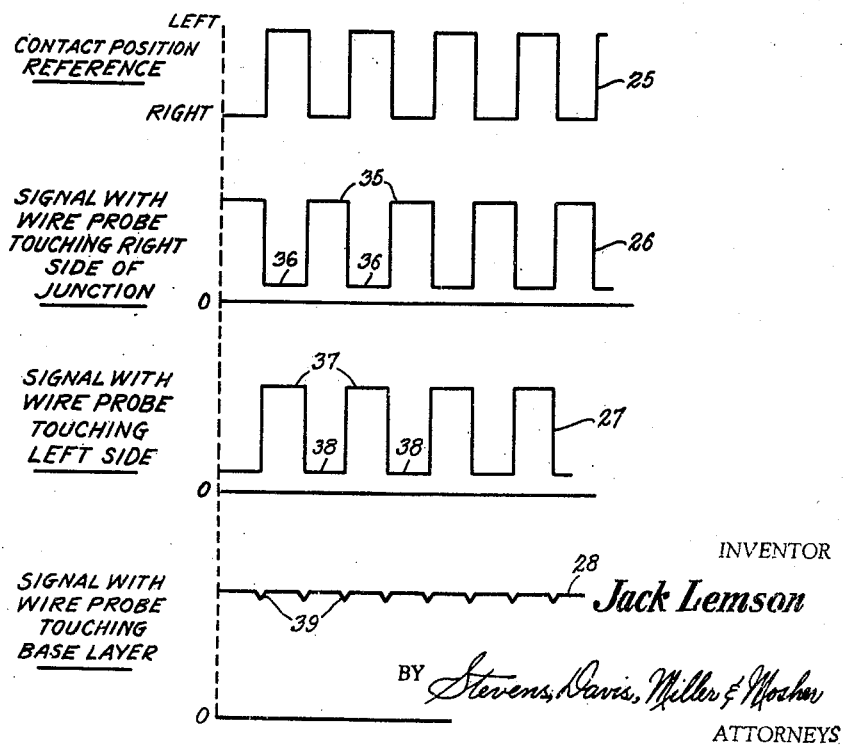
Figure 2 shows waveforms produced in the circuit shown in Figure 1.

The waveforms are illustrated in Figure 2. The waveform 25 is the idealized reference voltage appearing on the lead 22. The waveform 26 is the signal voltage appearing on the lead 23 with the wire probe in contact with the end section 21. The waveform 27 is the signal voltage appearing on the lead 23 with the probe 18 in contact with the end section 20. When the probe is in contact with the end section 21 and the vibrating contact 13 engages the contact 15, a relatively high current flows from the battery 19, through the probe 18, the end section 21, the metal block 31, the contacts 15 and 13 and the resistor 16. This high current corresponds to the high part 35 of the signal waveform 26. When the contact 13 engages the contact 14, a relatively low current flows from the battery 19, through the probe 18, the end section 21, the base section 24, the end section 20, the metal block 30, the contacts 14 and 13 and the resistor 16. This low current corresponds to the low part 36 of the waveform 26. This current is low relative to the current corresponding to the high part 35 of the waveform 26 because of the rectifying action between the base section 24 and the end section 21, which opposes the current flow from the end section 21 into the base section 24. When the probe 18 is in contact with the end section 20, a relatively high current flows when the contact 13 engages contact 14 and a low current flows when the contact 13 engages the contact 15. This variation in current results in the signal waveform 27 appearing across the resistor 16 with its high part 37 corresponding to the high current and its low part 38 corresponding to the low current. The variation in current is similarly due to the rectifying action between the end section 20 and the base section 24, which opposes current flow from the end section 20 into the base section 24.

Of course, if the probe 18 should, by chance, make contact to the base section 24, full current would flow with the switch contact 13 in both positions since no rectifying junction is present in either circuit with the probe biased positively as shown in Figure 1. The signal output for this condition would be waveform 28 of Figure 2. The small pips 39 are produced by the momentary interruption of current as the contact 13 switches from one position to the other.

The invention has been described with respect to a transistor bar which has a p-type base section and n-type emitter and collector sections. The invention is also applicable to a transistor bar having an n-type base section and p-type emitter and collector sections. Also, the probe can be biased negatively instead of positively, or even an A.C. voltage with a frequency substantially higher than the carrier voltage could be applied to the probe. Other means for alternately switching between the two end sections 20 and 21 could be used instead of the carrier controlled switch 12. These and other modifica-

What is claimed is:

1. A method of locating the base section of a transistor bar comprising the steps of; connecting a probe to one terminal of an electrical power source, placing said probe in contact with said transistor bar, alternately connecting each end section of said transistor bar to the other terminal of said power source, moving said probe across said bar so that it crosses said base section, and detecting the waveform of current flowing through said probe.

2. A method as recited in claim 1 wherein said electrical power source is a D.C. power source.

3. An apparatus for locating the base section of a transistor bar comprising; a probe, means to connect one terminal of an energizing voltage source to said probe, means to connect the other terminal of said energizing voltage source alternately to each end section of said transistor bar, and means to indicate the waveform of the current flowing through said probe.

4. An apparatus as recited in claim 3 wherein said energizing voltage source comprises a D.C. source of voltage.

5. An apparatus as recited in claim 3 wherein said means to connect the other terminal of said energizing voltage source alternately to each end section comprises a vibrating contact, an exciting winding for said contact, and source of power to apply an alternating voltage to said exciting winding.

6. An apparatus as recited in claim 3 wherein said means to indicate the waveform of the current flowing through said probe comprises an impedance connected in series with said probe and said source of energizing voltage.

7. A method of locating the base section of a transistor bar comprising the steps of; placing a probe in contact with said bar, providing an alternating voltage, connecting an energizing voltage between said probe and each end section of said transistor bar alternately in synchronism with said alternating voltage, moving said probe across said bar so that it crosses said base section, and comparing the waveform of the current passing through said probe and the waveform of said alternating voltage.

8. A method of locating the base section of a transistor bar comprising the steps of; placing a probe in contact with said bar, providing a reference voltage, connecting an energizing voltage between said probe and each end section of said transistor bar alternately in synchronism with said reference voltage, moving said probe across said bar so that it crosses said base section, and simultaneously displaying the waveform of the current passing through said probe and the waveform of said reference voltage.

References Cited in the file of this patent

UNITED STATES PATENTS

| | | |
|---|---|---|
| 2,748,349 | Dickten | May 29, 1956 |
| 2,802,160 | Engeler | Aug. 6, 1957 |